United States Patent [19]

Peacock

[11] Patent Number: 5,468,808
[45] Date of Patent: Nov. 21, 1995

[54] REDUCTION OF FLOW MARKS IN RUBBER MODIFIED POLYPROPYLENE

[75] Inventor: Andrew J. Peacock, Houston, Tex.

[73] Assignee: Exxon Chemical Patents Inc., Wilmington, Del.

[21] Appl. No.: 304,754

[22] Filed: Sep. 12, 1994

[51] Int. Cl.⁶ .................. C08L 23/10; C08L 23/12; C08L 23/18
[52] U.S. Cl. .............. 525/240; 525/242; 524/490; 524/491; 524/504; 524/505; 524/529
[58] Field of Search ............... 524/491, 490, 524/504, 505, 529; 525/240, 242

[56] References Cited

U.S. PATENT DOCUMENTS

| | | | |
|---|---|---|---|
| 4,255,531 | 3/1981 | Arbit | 525/237 |
| 4,442,233 | 4/1984 | Lohmar et al. | 524/491 |
| 4,522,994 | 6/1985 | Chiba et al. | 525/240 |
| 5,045,589 | 9/1991 | Ueno | 524/505 |
| 5,095,063 | 3/1992 | Okada et al. | 524/504 |
| 5,180,629 | 1/1993 | Terada et al. | 525/240 |
| 5,260,366 | 11/1993 | Mitsuno et al. | 524/505 |
| 5,283,267 | 2/1994 | Nishio et al. | 524/505 |
| 5,349,005 | 9/1994 | Tanaka | 524/491 |
| 5,369,181 | 11/1994 | Hwo | 525/240 |

FOREIGN PATENT DOCUMENTS

| | | |
|---|---|---|
| 0469799A2 | 2/1992 | European Pat. Off. . |
| 0532764A1 | 3/1993 | European Pat. Off. . |
| 0593221A2 | 4/1994 | European Pat. Off. . |
| 5364257 | 6/1978 | Japan . |

Primary Examiner—Paul R. Michl
Assistant Examiner—Olga Asinovsky
Attorney, Agent, or Firm—M. Susan Spiering

[57] ABSTRACT

The addition of small amounts of low molecular weight visco-elastic rubber material to rubber-modified polypropylene has been Found to reduce the severity of flow marks that occur on the surface of injection molded articles.

18 Claims, No Drawings

REDUCTION OF FLOW MARKS IN RUBBER MODIFIED POLYPROPYLENE

FIELD OF THE INVENTION

This invention relates to polypropylene resins. Particularly, the invention relates to the reduction of flow marks in rubber modified polypropylene articles produced during an injection molding process. More particularly, the invention relates to an injection molding composition comprising a mixture of (a) blend of polypropylene and at least one high molecular weight rubber component, and (b) at least one low molecular weight, visco-elastic liquid component.

BACKGROUND OF THE INVENTION

Polypropylene is known to have excellent heat resistance, chemical resistance, electric properties, rigidity, tensile strength, optical characteristics and is also known to process easily. Crystalline propylene-ethylene resins are known to mold easily and have been broadly used for injection molding, film- or sheet-extrusion molding, blow molding, and like applications.

Rubber modified polypropylene resins produce articles which generally exhibit a desirable balance of such properties as melt strength, flexural modulus, yield stress and elongation, tensile stress, N-izod, Gardner Impact, heat distortion temperature values, and the like. Unfortunately, polypropylene articles are also known to exhibit surface imperfections, such as flow marks and silver streaks. Silver streaks are generally associated with an overheating phenomena while flow mark imperfections appear to be associated with the viscosity, or flowability, of the resin.

Flow marks manifest on the surface of injected molded articles as a series of alternating high and low gloss chevrons. The general trend of each band is approximately perpendicular to the direction of melt flow during injection. Flow marks are not unique to rubber modified polypropylene since homopolymers also display the phenomena under various molding conditions. While these marks do not perceivably affect mechanical properties of the molded article, nor are they discernible by touch, nonetheless their presence gives the appearance of inhomogeneity within molded parts reducing their aesthetic appeal. The effect is pronounced in large samples with a high aspect ratio, such as automobile parts, for example, dashboards and bumper covers.

The art has attempted to reduce flow marks in molded articles by decreasing the viscosity of the polypropylene resin. This technique decreased the appearance of the flow marks, however the decrease in viscosity also modified other physical properties. Flow marks may also be decreased by annealing the article after the molding process. This annealing step however is not commercially feasible or desirable in view of the increased energy required to anneal the article, extended time to anneal, and equipment modification necessary to allow injection molding apparati to also serve as annealing mediums. Adding fibrous or granular fillers, such as calcium carbonate or glass fibers to polypropylene compositions tends to improve rigidity of the molded article, however the surface appearance tends to be poor and these fillers give rise to warpage and deformation in the resultant article. The art has also described adding rubber components to polypropylene to improve the appearance of the resultant injection molded or welded articles. However, the art has concentrated on use of thermoplastics or high molecular weight solid components to improve the general appearance, coatability, and weldability of the resultant molded articles.

Numerous methods have been attempted to decrease flow marks in polypropylene resin compositions, however, these methods have failed to improve the appearance of the resultant article without sacrificing desirable physical properties. Thus, there exists a need to reduce the flow marks in articles produced from polypropylene resins, without affecting other physical properties.

SUMMARY OF THE INVENTION

In an embodiment, the inventive composition comprises a mixture of (a) a blend of polypropylene and a high molecular weight rubber compound, and (b) a small amount of a liquid, low molecular weight rubber. To the inventor's knowledge, the art has not, to date, considered the use of liquid rubbers (termed herein as a visco-elastic liquid), to modify polypropylene blends for reducing flow marks in the resultant injection molded article. One of skill in the art generally considers use of liquid rubbers in polypropylene compositions to reduce gloss and lead to stickiness or tackiness due to the migration of the low molecular weight component. It has been discovered that the use of low molecular weight liquid rubber in an amount less than about 10 weight % relative to the polypropylene blend reduces the severity of flow marks in resultant injection molded articles without materially affecting desirable properties.

The present invention thus relates to a composition useful for injection molding, a process for injection molding articles therefrom, and the injection molded articles themselves having reduced flow marks compared to traditional polypropylene injection molded articles known to date. The composition of the present invention comprises a mixture of a blend of substantially crystalline polypropylene, and at least one rubber compound having a weight average molecular weight of at least about 100,000, wherein the blend has a melt flow rate (MFR) at 230° C. of about 1 to about 50 g/10 min., with a visco-elastic liquid, in the range of about 0.5 to about 10 weight % relative to the polypropylene blend.

The high molecular weight rubber compound is essentially non-crystalline, preferably has a molecular weight greater than 100,000, and is selected from the group consisting of ethylene-α-olefin copolymer rubber wherein the olefin contains from 3 to about 20 carbon atoms, and ethylene is present at up to about 80 mole %. The high molecular weight rubber compound is generally present in the range of about 2 to about 50 weight % relative to the blend.

The visco-elastic liquid is a low molecular weight compound having a weight average molecular weight of about 2000 to about 40,000. It is present in an amount ranging from about 0.5 to about 10 weight % and is generally selected from the group consisting of ethylene-α-olefin copolymer rubber wherein the olefin contains from 3 to about 20 carbon atoms, and ethylene is present in the range of about 20 to about 80 mole %. The visco-elastic liquid may be selected from non-ethylene containing rubbers provided that the rubber selected is a liquid at room temperature and has a molecular weight less than about 40,000.

Additives known in the art may be incorporated in the polypropylene blend to impart other desired properties. Examples of additives include fillers, stabilizers, antioxidants, rubber compounding additives, plasticizers, pigments, and mixtures of any of these.

DETAILED DESCRIPTION OF PREFERRED EMBODIMENTS

It has been discovered that the addition of low molecular weight liquid rubber to crystalline polypropylene modified with some high molecular weight rubber component, reduces the severity of flow marks on injection molded articles. The reduction of flow marks enhances the appearance of the article and thus its commercial value.

As used herein, molecular weight is weight average molecular weight. ASTM for MFR is ASTM D1238. Density of fully crystalline isotactic polypropylene is 0.936 g/cm$^3$. Polypropylene is intended to include crystalline polypropylene, homo- or copolymers of propylene, isotactic, or syndiotactic polypropylene, provided that the polymer contains crystalline propylene units having about or greater than 25% crystalline nature based on density values as defined herein. Random copolymers are defined herein as being polymers of primarily propylene units with small amounts of α-olefin. Rubber modified polypropylene polymers are defined herein as having polypropylene as their major component and some high molecular weight ethylene-α-olefin-rubber component(s). Any polypropylene having at least 25% crystalline nature which can be blended with a high molecular weight rubber, and the resultant blend further blended with small amount of a visco-elastic liquid rubber may be employed herein.

In accordance with the present invention, there is provided a composition useful for injection molding comprising a mixture of (a) a blend of substantially crystalline polypropylene, and, at least one rubber compound having a weight average molecular weight of at least about 100,000, wherein the blend has a melt flow rate (MFR) at 230° C. of about 1 to about 50 g/10 min.; and, (b) a visco-elastic liquid in an amount of up to about 10 weight %, preferably in the range of about 0.5 to about 10 weight % relative to the blend.

POLYPROPYLENE:

In accordance with the present invention, polypropylene may be homopolypropylene, or copolymers of propylene, or blends thereof. Copolymers may include two or more monomeric units, and are most preferably random copolymers of propylene and an α-olefin having 2 or from 4 to about 20 carbon atoms. There is no particular limitation on the method for preparing this propylene polymer. However in general, the polymer is a propylene homopolymer obtained by homopolymerization of propylene in a single stage or multiple stage reactor. Copolymers may be obtained by copolymerizing propylene and an α-olefin having 2 or from 4 to about 20 carbon atoms, preferably ethylene, in a single stage or multiple stage reactor. Polymerization methods include high pressure, slurry, gas, bulk, or solution phase, or a combination thereof, using a traditional Ziegler-Natta catalyst or a single-site, metallocene catalyst system. The catalyst used is preferably one which has a high isospecificity. Polymerization may be carried out by a continuous or batch process and may include use of chain transfer agents, scavengers, or other such additives as deemed applicable.

The propylene polymer of the present invention is generally greater than about 25% crystallinity, preferably greater than about 35%, and most preferably greater than about 50% crystallinity in nature based on a density of isotactic polypropylene of 0.936 g/cm$^3$. It may be random or block copolymers. Block copolymers generally require more monomer to produce compared to random copolymers, and therefore are not recommended from a cost analysis perspective. The propylene polymer may be a combination of homopolypropylene, and/or random, and/or block copolymers as described herein. When the above propylene polymer is a random copolymer, the percentage of the copolymerized α-olefin in the copolymer is, in general, up to about 7 mole %, preferably about 1 to about 5 mole %, most preferably 2 to about 4 mole %. The preferred α-olefins contain 2 or from 4 to about 12 carbon atoms and most preferably contain from 4 to about 8 carbon atoms. The most preferred α-olefin is ethylene. One, or two or more α-olefins can be copolymerized with propylene.

Exemplary α-olefins may be selected from the group consisting of ethylene, butene-1, pentene-1,2-methylpentene-1,3-methylbutene-1, hexene-1,3-methylpentene-1,4-methylpentene-1,3,3-dimethylbutene-1, heptene-1, hexene-1, methylhexene-1, dimethylpentene-1 trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1 and hexadodecene-1.

If the content is too high, the amount of a non-crystalline component is increased, and as a result, the blend will tend to produce a molded product which is "sticky" or "tacky."

RUBBER:

The rubber compound of the polypropylene blend is essentially a high molecular weight, non-crystalline component, preferably containing no greater than about 5 to about 10 weight % crystalline nature. The rubber generally has a molecular weight of greater than about 100,000, and is generally present in an amount up to about 50 weight %, preferably in the range of about 2 to about 50 weight %, more preferably about 5 to about 20 weight %, and most preferably about 8 to about 15 weight % relative to the blend. The rubber component is preferably added to the polypropylene in an amount sufficient to improve impact resistance, but not substantially deteriorate the modulus of the resultant molded article.

The rubber compound may be ethylene-α-olefin copolymer rubbers wherein the olefin contains from 3 to about 20 carbon atoms, and ethylene is present in an amount up to about 80 mole %, preferably in the range of about 20 to about 80 mole %, more preferably in the range of about 40 to about 60 mole %. The most preferred rubber compound to blend with the propylene polymer is ethylene propylene random copolymer. Rubber copolymers may also be ethylene-α-olefin-non-conjugated diene copolymers, wherein the dienes include for example cyclopentadiene, hexadiene, octadiene, norbornadiene and the like. Rubbers may also be natural rubber, isobutene rubber, butadiene rubber, 1,2-polybutadiene, styrene-butadiene random copolymer rubber, or chloroprene rubber, nitrile rubber, styrene-isoprene-styrene block copolymer rubber, ethylvinyl-acetate. Ethylenic copolymer rubbers can be used alone or as a mixture thereof.

The molecular weight of the rubber is generally greater than about 100,000, however, the amount greater than 100,000 is not critical provided that the polypropylene-rubber blend can be kneaded in an extruder, blender, or mixing process. Too low of a molecular weight can be critical since it would create difficulties in blending the rubber with the polypropylene.

BLEND:

The polypropylene-rubber blend is characterized by its MFR. Melt flow rates are as determined by ASTM D1238. The MFR of the blend is generally from about 1 to about 50 g/10 min, preferably in the range of about 2 to about 30 g/10 min, and most preferably about 5 to about 10 g/10 min. When the MFR value is too low, it is difficult to obtain polymer having the proper flow properties for injection molding and it becomes difficult to mold articles from the final polymer product. If the MFR is too high, the final composition tends to have reduced impact strength. The injection molding composition preferably has an impact resistance of about unnotched izod at −40° C. for an unfilled (no talc) resin >5 ft-lb (>0.7 kg-m) and a flexural modulus of >150,000 psi (10.3×10$^5$ kPa).

VISCO-ELASTIC LIQUID:

The discovery that small amounts of visco-elastic liquid added to the polypropylene blend reduced flow marks was truly unexpected in view of the migration possibilities of low molecular weight components in injection molded articles. Experiments indicated that when liquid rubber was added in amounts less than 10 weight % relative to the blend, no measurable tackiness or stickiness was observed in the molded article. Additionally, no loss of gloss was observed. As used herein, visco-elastic liquid, low molecular weight liquid, and liquid rubber are interchangeable terms, all meaning a rubber compound having a weight average molecular weight less than about 40,000, liquid at room temperature, or is liquid as long as stress is applied.

In a preferred embodiment, the visco-elastic liquid of the present polypropylene composition generally has a weight average molecular weight of about 2000 to about 40,000, preferably has a molecular weight of about 5000 to about 20,000, and most preferably a molecular weight of about 7000 to about 12,000. The liquid rubber is generally present in an amount of less than about 5 weight %, preferably ranging from about 0.5 to about 5 weight %, more preferably in an amount ranging from about 1 to about 3 weight %, and most preferably about 1 to about 2 weight %.

The composition of the visco-elastic liquid is similar to that described for the high molecular weight rubber employed in the polypropylene blend. However, the visco elastic liquid herein is low molecular weight and liquid at room temperature to impart the reduced flow mark effect described herein for the final molded article.

Generally, like the high molecular weight rubber, the visco-elastic liquid may selected from the group consisting of ethylene-α-olefin copolymer rubber, including diene containing polymers, wherein the olefin contains from 3 to about 20 carbon atoms, and ethylene is present in the range of about 20 to about 80 mole %, preferably in the range of about 40 to about 60 mole %. The copolymer is preferably selected from the group consisting of ethylene-propylene random copolymer, ethylene-propylene-diene random copolymer, and ethylene-norbornene random copolymer, with the most preferred low molecular weight rubber being ethylene propylene random copolymer.

The visco-elastic liquid may further be selected from the group consisting of natural rubber, isobutene rubber, butadiene rubber, 1,2-polybutadiene, styrene-butadiene random copolymer rubber, chloroprene rubber, nitrile rubber, styrene-isoprene-styrene block copolymer rubber, and ethyl-vinyl-acetate.

ADDITIVES:

Various additives may be present in the composition of the invention to enhance a specific property or may be present as a result of processing of the individual components. Additives which may be incorporated include for example, fire retardants, antioxidants, plasticizers, and pigments. Other additives which may be employed to enhance properties include antiblocking agents, coloring agents, stabilizers, and oxidative-, thermal-, and ultraviolet-light-inhibitors. Lubricants, mold release agents, nucleating agents, reinforcements, and fillers (including granular, fiberous, or powder-like) may also be employed. Nucleating agents and fillers tend to improve rigidity of the article. The list described herein is not intended to be inclusive of all types of additives which may be employed with the present invention. Upon reading this disclosure, those of skill in the art will appreciate other additives may be employed to enhance properties of the composition and maintain a reduced flow mark effect on the resultant injection molded article. The addition of talc as an additive was found to increase the stiffness and the heat distortion temperature of the injection molding composition. According talc, as an additive, is preferably employed in amount sufficient to increase the elastic modulus of the article.

PROCESS

Components of the composition described herein are well blended by techniques known to those of skill in the art. Generally, a usual kneading machine such as Banbury mixer, a kneader, a monoaxial or biaxial extruder may be employed to blend the components. The blended or mixed components are used as the material for the injection molded article, and supplied to an injection molding machine to be injection molded into a desired shape. The article may be, for example, a large sized automotive part such as a bumper, a facia, a fender air dam, molding, grill, dashboard, or car trim. Other molded articles may include washer tubs, automobile bumper covers, and articles of similar durable characteristics.

Processing the composition described herein into a molded article thus comprises:

A. injecting a mixture of a blend of
  (i) substantially crystalline polypropylene, and at least one rubber compound having a weight average molecular weight of at least about 100,000, wherein the blend has a melt flow rate (MFR) at 230° C. of about 1 to about 50 g/10 min.; and,
  (ii) a visco-elastic liquid in the range of about 0.5 to about 10 weight % relative to the blend;
B. into an injection molding apparatus for a sufficient period of time to produce an article.

Thus having broadly described the present invention and a preferred and most preferred embodiment, it is believed that the same will become even more apparent by reference to the following examples. It will be appreciated that the examples are presented solely for purposes of illustration and should not be construed as limiting the invention.

EXAMPLES

Examples 1–6

The blend of the composition evaluation consisted of rubber modified PP ("071") produced by a multiple stage series polymerization reactor consisting essentially of 79% isotactic PP ($M_w$ 183,000, $M_w/M_n$ approx. 4.7), 3% atactic PP, 12% ethylene-propylene rubber (approx. 65–70 weight % ethylene, approx. $M_w$ 196,000, $M_w/M_n$ approx. 11.1), 6% crystallizable EP copolymer (>80 weight % ethylene, approx. $M_w$ 149,000, $M_w/M_n$ approx. 4.4). The blend had a MFR of about 8 g/10 min. and was further modified with the low molecular weight (approx. $M_w$ 10,000) visco-elastic liquid which consisted essentially of approx. 50 weight % ethylene and approx. 50 weight % propylene, $M_w/M_n$ approx. 2.3. The composition was evaluated as is, (Ex. 1) with 1 (Ex. 2 and 5) or 2 (Ex. 3 and 6) weight % visco-elastic rubber (described above), and with (Ex. 4–6) and without talc (Ex. 1–3).

Blending of the mixture was performed on a 7 pound Banbury mixer (Model 74 A1668). Flow mark evaluation was determined by injection molding standard plaques (12"×5"×1/16", injected through a pair of gates on one of the short sides of the plaque) under a variety of conditions as outlined in the tables herein. Molding injection pressure was about 1,000 kg/cm². The samples containing talc required higher injection temperatures than their unfilled counterparts to ensure complete mold filling. Flow mark ratings of the molded blends and the base resins as a function of injection temperature and ram speeds are listed in Table 1. 0=flow marks covering complete surface. 10=no discernible flow marks. The greater the value, the lower the flow mark severity. Intermediate ratings are proportional to the distance from the gate at which flow marks are just discernible, i.e. if flow marks commence 60% of the way down the plaque it receives a rating of 6. ASTM test pieces were also injection molded under standard conditions so that the physical properties of the blends could be examined.

Physical properties of the molded article are listed in Table 2. The addition of small quantities of visco-elastic rubber did not materially affect (or degrade) the low temperature impact strength of the resultant articles.

Table 1 indicates that the addition of small amounts of low molecular weight liquid rubber reduced the severity of flow marks in the majority of cases.

Table 2 indicates that key physical attributes of the articles were not seriously degraded by the addition of small quantities of liquid rubber.

TABLE 1

Flow Mark Severity for Examples 1–6

| Injection temp/ ram speed (°C.)/(in/sec) | 071 Ex. 1 | 071 Ex. 2 +1% liquid E/P copolymer | 071 Ex. 3 +2% liquid E/P copolymer | 071 Ex. 4 +30% talc | 071 Ex. 5 +1% liquid E/P copolymer +30% talc | 071 Ex. 6 +2% liquid E/P copolymer +30% talc |
|---|---|---|---|---|---|---|
| 408/0.4 | 6 | 7 | 10 | | | |
| 408/8.0 | 7 | 7 | 7 | | | |
| 428/0.4 | 10 | 10 | 10 | | | |
| 428/1.0 | 10 | 6 | 10 | | | |
| 428/8.0 | 8 | 7 | 5 | | | |
| 438/0.4 | | | | 0 | 1 | 1 |
| 438/1.0 | | | | 1 | 1 | 1 |
| 438/8.0 | | | | 4 | 5 | 6 |
| 458/0.4 | | | | 2 | 2 | 2 |
| 458/8.0 | | | | 4 | 5 | 5 |

Table 1. Flow mark severity as a function of E/P copolymer addition and molding conditions.
E/P = ethylene-propylene liquid rubber

TABLE 2

Mechanical Properties of Molded Articles of Examples 1–6

| | 071 Ex. 1 | 071 Ex. 2 +1% liquid E/P copolymer | 071 Ex. 3 +2% liquid E/P copolymer | 071 Ex. 4 +30% talc | 071 Ex. 5 +1% liquid E/P copolymer +30% talc | 071 Ex. 6 +2% liquid E/P copolymer +30% talc |
|---|---|---|---|---|---|---|
| Flexural modulus, tangent (at 23° C. kPSI) | 175.5 | 167.2 | 163.6 | 417.1 | 422.8 | 386.2 |
| Yield stress (PSI) | 3807 | 3773 | 3673 | 4053 | 3987 | 3788 |
| Yield elongation (%) | 14.2 | 15.2 | 14.5 | 5.9 | 6.0 | 6.5 |
| tensile strength (PSI) | 2010 | 1658 | 2128 | 2439 | 2421 | 2183 |
| tensile elongation at | 357 | 400 | 464 | 45 | 60 | 62 |

TABLE 2-continued

Mechanical Properties of Molded Articles of Examples 1–6

|  | 071 Ex. 1 | 071 Ex. 2 +1% liquid E/P copolymer | 071 Ex. 3 +2% liquid E/P copolymer | 071 Ex. 4 +30% talc | 071 Ex. 5 +1% liquid E/P copolymer +30% talc | 071 Ex. 6 +2% liquid E/P copolymer +30% talc |
|---|---|---|---|---|---|---|
| break (%) |  |  |  |  |  |  |
| notched Izod 23° C. (ft lb) | 1.38 | 1.27 | 1.36 | 0.89 | 0.91 | 1.05 |
| unnotched Izod −18° C. (ft lb) | 14.34 | 13.73 | 13.77 | 3.14 | 3.87 | 3.63 |
| unnotched Izod −29° C. (ft lb) | 12.86 | 12.89 | 11.75 | 2.76 | 3.07 | 3.20 |
| unnotched Izod −40° C. (ft lb) | 12.53 | 11.05 | 10.73 | 2.90 | 2.93 | 2.77 |
| Gardner Impact Strength −29° C. (ft lb) | 243 | 223 | 220 | <8 | 15 | 13 |
| Heat distribution temp. (°C.) | 87.7 | 84.3 | 85.4 | 126.3 | 126.4 | 123.0 |

Table 2. Mechanical properties of rubber modified PP incorporating additional E/P copolymer.

I claim:

1. A composition comprising
   a blend of (i) a polymer of propylene containing units of crystalline propylene having at least 25% crystallinity and of (ii) at least one high molecular weight rubber having a weight average molecular weight of at least about 100,000,
   wherein said blend has a melt flow rate (MFR) at 230° C. of about 1 to about 50 g/10 min.
   with a visco-elastic liquid added in the range of about 0.5 to about 10 weight % of total composition weight wherein said visco-elastic liquid is a rubber having weight average molecular weight less than about 40,000 and which is liquid at room temperature.

2. The composition of claim 1 wherein said blend has an MFR of about 2 to about 30 g/10 min.

3. The composition of claim 1 comprising in the range of about 5 to about 20 weight % of total blend weight of high molecular weight rubber.

4. The composition of claim 1 wherein said polymer of propylene is a copolymer of propylene and of less than about 20 mole % at least one α-olefin comonomer having 4 to about 20 carbon atoms.

5. The composition of claim 4 wherein said α-olefin is present in an amount ranging from about 3 to about 5 mole % of said copolymer.

6. The composition of claim 1 wherein said polymer of propylene is a copolymer of propylene and of less than about 10 mole % ethylene comonomer.

7. The composition of claim 1 wherein said high molecular weight rubber is an ethylene α-olefin copolymer of an α-olefin containing from 3 to about 20 carbon atoms, and about 20 to about 80 mole % ethylene.

8. The composition of claim 1 wherein said visco-elastic liquid has a weight average molecular weight of about 5000 to about 20,000.

9. The composition of claim 1 wherein said visco-elastic liquid is added in an amount ranging from about 0.5 to about 5 weight % of total composition weight.

10. The composition of claim 1 wherein said visco-elastic liquid is an ethylene-α-olefin copolymer of an α-olefin 3 to about 20 carbon atoms, and of about 20 to about 80 mole % ethylene.

11. The composition of claim 1 wherein said visco-elastic liquid is a copolymer of ethylene, propylene and a diene.

12. A process for preparing an injection molded article comprising
   injecting polypropylene-rubber blend of
      a polymer of propylene containing crystalline units of propylene having at least 25% crystallinity and (ii) of at least one high molecular weight rubber having a weight average molecular weight of at least about 100,000, wherein said blend has a melt flow rate (MFR) at 230° C. of about 1 to about 50 g/10 min.
   with a visco-elastic liquid added in the range of about 0.5 to about 10 weight % of total composition weight wherein said visco-elastic liquid is a rubber having a weight average molecular weight less than about 40,000 and which is liquid at room temperature;
   into an injection molding apparatus for a sufficient period of time to produce an article.

13. Molded articles prepared by the process of claim 12.

14. An additive for impact modified polypropylene comprising a visco-elastic liquid rubber having a weight average molecular weight of about 2,000 to about 40,000 and which is liquid at room temperature.

15. A method to decrease flow marks of high molecular weight rubber modified polypropylene comprising adding as an additive a visco-elastic liquid rubber having a weight average molecular weight of about 2,000 to about 40,000 and which is liquid at room temperature.

16. A method of broadening the effective molecular weight distribution of a polymer of propylene comprising a noncrystalline portion by adding a liquid copolymer of ethylene and of propylene, wherein said liquid copolymer is liquid at room temperature and has a weight average molecular weight in the range of about 2,000 to 40,000.

17. A method of claim 16 wherein said polymer of propylene is a copolymer of propylene and ethylene.

18. A method of claim 16 wherein said polymer of propylene is a copolymer of propylene and one or more α-olefins having 1 to 20 carbon atoms.

* * * * *